United States Patent [19]
Ohta

[11] Patent Number: 5,956,432
[45] Date of Patent: *Sep. 21, 1999

[54] IMAGE PROCESSING APPARATUS AND METHOD

[75] Inventor: Kenichi Ohta, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/655,882

[22] Filed: May 31, 1996

[30] Foreign Application Priority Data

Jun. 1, 1995 [JP] Japan .................................. 7-135025

[51] Int. Cl.$^6$ ...................................................... G06K 9/40
[52] U.S. Cl. .......................... 382/264; 382/162; 382/261; 382/272; 382/278
[58] Field of Search ..................................... 382/162, 167, 382/222, 261, 263, 264, 266, 272, 278; 358/515, 518, 532

[56] References Cited

U.S. PATENT DOCUMENTS

5,331,442  7/1994  Sorimachi ............................. 358/532

*Primary Examiner*—Phuoc Tran
*Attorney, Agent, or Firm*—Fitzpatrick, Cella, Harper & Scinto

[57] ABSTRACT

In an image processing apparatus and method for effectively removing noise from an input image signal, a mean-value calculation unit calculates the mean value of pixels within a predetermined region in the vicinity of a target pixel, for each color component. A binary-coding unit performs binary-coding processing of the values of pixels within the predetermined region, for each color component, based on the mean value for each color component. A correlation-coefficient calculation unit calculates a correlation coefficient from characteristics between binary image data of respective color components. A smoothing unit performs smoothing processing by adding the value of the target pixel and the mean value using the calculated correlation coefficient, for example as a weight.

23 Claims, 5 Drawing Sheets

IMAGE DATA

| 100 | 90 | 80 |
|---|---|---|
| 96 | 84 | 76 |
| 80 | 64 | 60 |

→ MEAN VALUE = 81 →

| 1 | 1 | 0 |
|---|---|---|
| 1 | 1 | 0 |
| 0 | 0 | 0 |

IMAGE PROCESSING APPARATUS AND METHOD

BACKGROUND OF THE INVENTION

1. Field of the Invention

This invention relates to an image processing apparatus and method, and more particularly, to an image processing apparatus and method for performing spatial frequency characteristic conversion, such as smoothing or sharpening processing, on an input image signal.

2. Description of the Related Art

In order to digitally read a color image by decomposing it into three color components, a flat-bed-type original reading apparatus using a one-dimensional line sensor, or a camera-type image pickup apparatus using a two-dimensional area sensor, is generally utilized.

However, an image signal output from such an apparatus includes an analog noise component from the sensor, and random noise generated due to the characteristics of an A/D (analog-to-digital) conversion circuit for converting a sensor output into a digital signal. Such noise degrades the quality of the obtained image. For removing the noise, smoothing processing in which the value of a target pixel in the image signal is replaced with the mean of the value of the target pixel and the values of pixels in the vicinity of the target pixel, is effective. However, such smoothing processing degrades sharpness of edge portions where gradation of the image abruptly changes, thereby degrading image sharpness.

An attempt to correct degradation of an image by removing noise by means of smoothing processing utilizing the spatial distribution or statistical characteristics of image data is now under way. For example, a method for removing only noise without degrading edges, by means of a smoothing filter called a median filter applied to the entire image, and a method for removing noise by performing smoothing processing for other regions than edge portions (regions where gradation gradually changes) by determining attributes of the image, have been proposed.

However, the above-described techniques have the following problems.

In the conventional methods, an edge portion is discriminated from a flat portion utilizing the signal distribution characteristics of an image, and filtering processing is (selected) based on the result of the determination. However, it is impossible to completely prevent occurrence of erroneous determination for an edge portion and a flat portion, and therefore it is inevitable that some noise remains, or degradation of edge portions occurs, to some extent.

The above-described problems also arise when performing sharpening processing of an image, such as edge emphasis or the like.

SUMMARY OF THE INVENTION

It is an object of the present invention to solve the above-described problems.

It is another object of the present invention to provide an image processing apparatus and method which can effectively smooth an input image signal.

According to one aspect, the present invention, which achieves these objectives, relates to an image processing apparatus comprising detection means for detecting correlation between color-component signals of an input image signal, and smoothing means for performing smoothing processing corresponding to the detected correlation for the image signal.

According to another aspect, the present invention, which achieves these objectives, relates to an image processing method comprising the steps of detecting correlation between color-component signals of an input image signal, and performing smoothing processing corresponding to the detected correlation for the image signal.

It is still another object of the present invention to excellently perform conversion of spatial-frequency characteristics of an image signal utilizing correlation between color components of an input image signal.

According to still another aspect, the present invention, which achieves the above-described object, relates to an image processing apparatus comprising detection means for detecting correlation between color-component signals of an input image signal, and conversion means for converting spatial-frequency characteristics of the image signal in accordance with the detected correlation.

According to yet another aspect, the present invention, which achieves the above-described object, relates to an image processing method comprising the steps of detecting correlation between color-component signals of an input image signal, and converting spatial-frequency characteristics of the image signal in accordance with the detected correlation.

The foregoing and other objects, advantages and features of the present invention will become more fully apparent from the following description of the preferred embodiments taken in conjunction with the accompanying drawings.

DESCRIPTION OF THE PREFERRED EMBODIMENTS

First Embodiment

An image processing apparatus according to a first embodiment of the present invention will now be described in detail with reference to the drawings.

Figure 1:
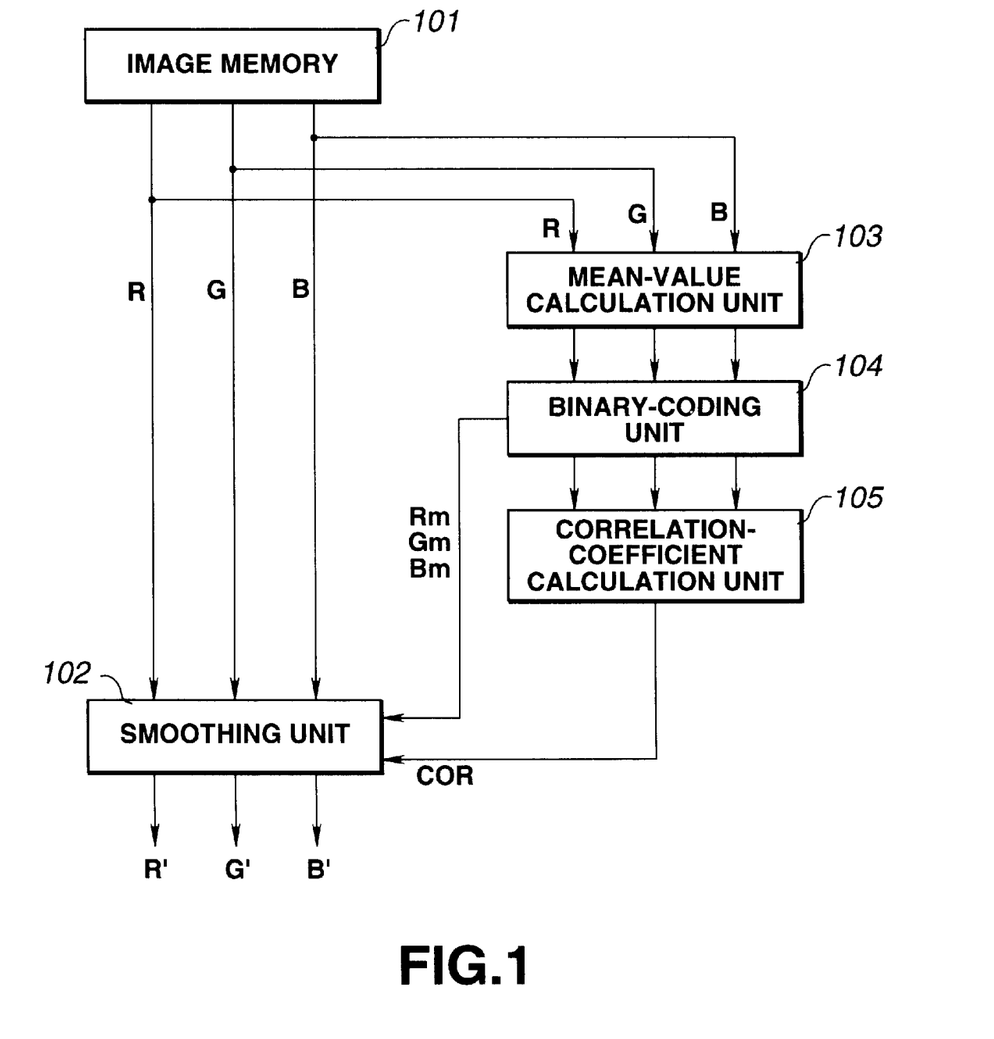
FIG. 1 is a block diagram illustrating the configuration of an image processing apparatus according to a first embodiment of the present invention.

FIG. 1 is a block diagram illustrating the configuration of the image processing apparatus of the first embodiment. In FIG. 1, control signals including a clock signal for synchronizing an image signal, and a memory and a buffer for adjusting timings are omitted.

In FIG. 1, an image memory 101 stores color image data for one picture frame. A smoothing unit 102 smooths the image data stored in the image memory 101 while sequentially reading it. A mean-value calculation unit 103 calculates the mean value of the values of pixels in the vicinity of a target pixel. A binary-coding unit 104 performs simple binary-coding processing of the target pixel based on the mean value output from the mean-value calculation unit 103. A correlation-coefficient calculation unit 105 calculates a correlation coefficient COR based on binary data output from the binary-coding unit 104.

The operations of the respective units will now be described.

Figure 2A:
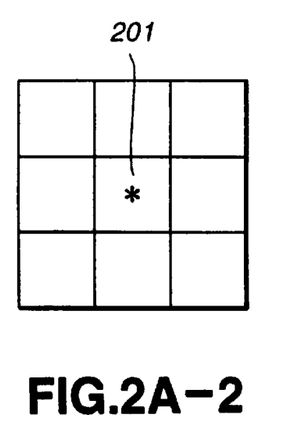
FIG. 2A and 2B are diagrams illustrating the processing of a mean-value calculation unit and a binary-coding unit shown in FIG. 1.
Figure 2A:
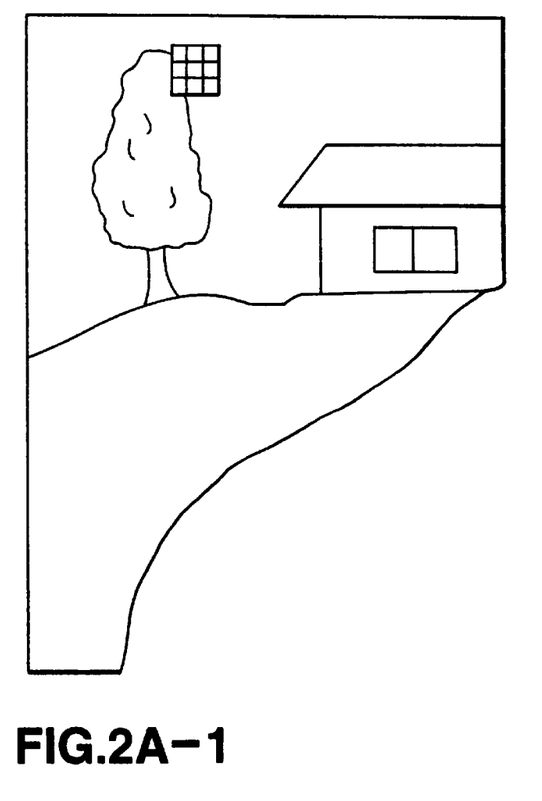

As illustrated in FIG. 2A, the mean-value calculation unit 103 reads R, G and B data of M×N pixels in the vicinity of a target pixel 201 from the image data stored in the image memory 101, and obtains the respective means values Rm, Gm and Bm. The obtained mean values Rm, Gm and Bm are transmitted to the binary-coding unit 104 and to the smoothing unit 102 in order to be utilized in smoothing processing (to be described later). Although in FIG. 2A, a case of M×N=3×3 pixels is illustrated, any other combination with N=3, 4, 5, 6, . . . and M=3, 4, 5, 6, . . . may also be adopted.

Figure 2B:
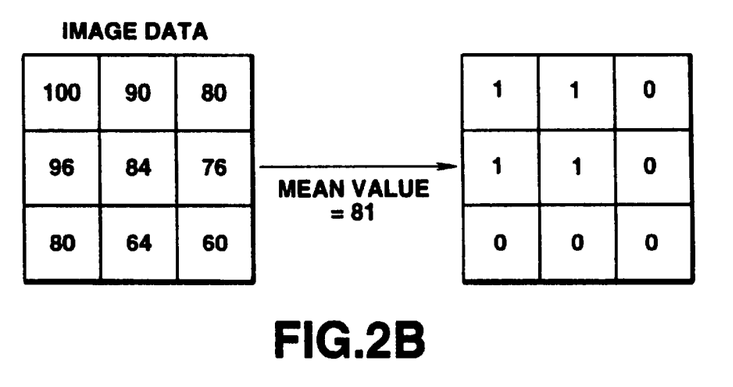

The binary-coding unit 104 performs binary-coding processing of the M×N pixel data based on the mean values input from the mean-value calculation unit 103. For example, when pixels, each comprising 8 bits for each color, have values as shown at the left side of FIG. 2B, the mean value of these values is '81' (used as a threshold). Hence, a target pixel (84) having a value larger than this threshold is binary-coded as '1'. As shown in FIG. 2B, each of the pixel data in the M×N block is binarized using the same threshold (=81).

Figure 3:
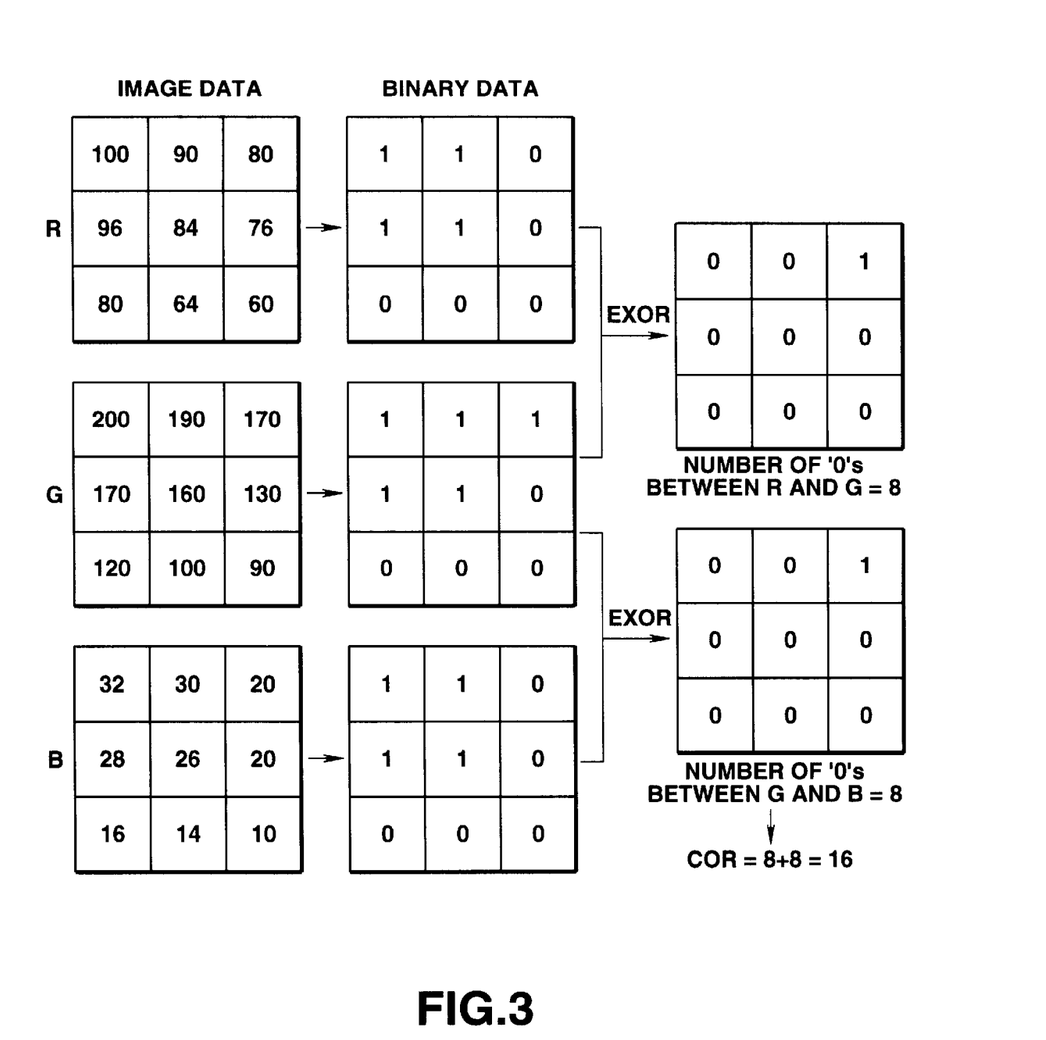
FIG. 3 and 4 are diagrams illustrating the operations of a correlation-coefficient calculation unit shown in FIG. 1.
Figure 4:
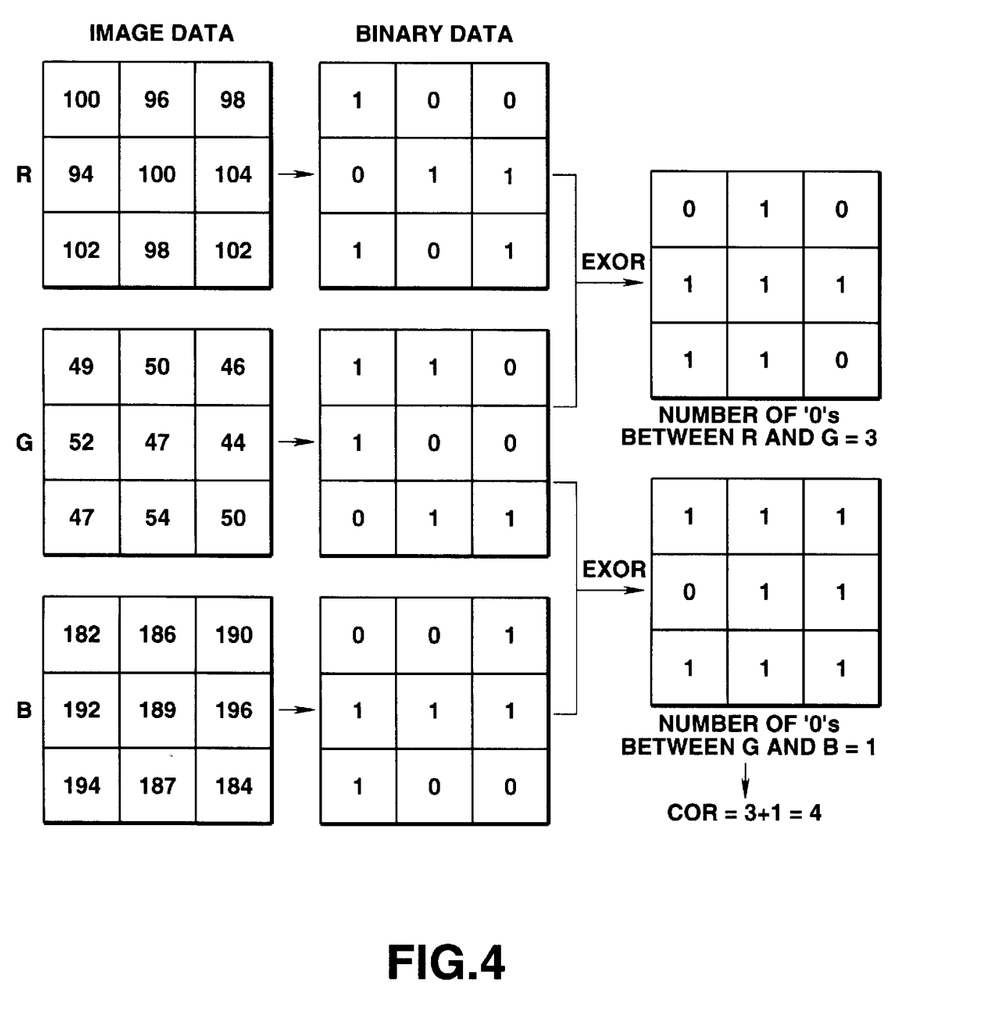

FIGS. 3 and 4 are diagrams illustrating the operations of the correlation-coefficient calculation unit 105, each illustrating a manner for obtaining a correlation coefficient COR based on R, G and B binary data obtained from the binary-coding unit 104.

FIG. 3 illustrates data at an edge portion of an image. There is a correlation in changes (the distribution) of pixel values among R, G and B data before binary-coding processing, though R, G and B pixel values differ from one another. Hence, substantially the same binary data are obtained after performing binary-coding processing of the respective data. On the other hand, FIG. 4 illustrates data at a flat portion of the image. Changes in pixel values are random among R, G and B data before binary-coding processing. Hence, different binary data are obtained after performing binary-coding processing of the respective data.

Since edge portions and flat portions in the image have the above-described characteristics, the correlation-coefficient calculation unit 105 extracts differences between the distribution of each color component in pixel values by calculating exclusive OR of R-component binary data and G-component binary data for each pixel and exclusive OR of G-component binary data and B-component binary data for each pixel, and counts the numbers of 0's (indicating that two binary-data coincide) included in the results of the two exclusive OR's. The obtained count value is output as the correlation coefficient COR of that M×N pixel region.

In the case of FIG. 3, the correlation coefficient is COR=16. In the case of FIG. 4, the correlation coefficient is COR=4. These results indicate that correlation is stronger in the case of FIG. 3 than in the case of FIG. 4.

The correlation coefficient thus obtained is transmitted to the smoothing unit 102. The smoothing unit 102 performs the following smoothing processing using the transmitted correlation coefficient COR as a parameter (here, as a weight). That is, the smoothing unit 102 performs smoothing processing so that the value of the target pixel within the M×N pixel region approaches the mean value of the region in inverse proportion to the correlation coefficient COR. More specifically, the value of the target pixel subjected to smoothing processing according to the following expression is obtained using the mean values Rm, Gm and Bm and the correlation coefficient COR input from the mean-value calculation unit 103:

$$X' = \{COR \times X + (n - COR) \times Xm\}/n \quad (1)$$
$$= (COR/n)(X - Xm) + Xm,$$

where X' is the pixel value (R', G',B') after the smoothing processing, X is the pixel value (R,G,B) before the smoothing processing, Xm is the means value (Rm,Gm,Bm), and n equals 2×M×N.

When performing the processing with 3×3 pixels as described above, the value n is 18, and 19 steps from step 0 to step 18 are provided in the smoothing processing.

According to the above-described processing, since the maximum value of the correlation coefficient COR equals n, X'=X at an edge portion where the COR has the maximum value, and input image data is output without being modified. At a flat portion where COR=0, X'=Xm, and the mean value within the M×N pixel region is output.

The R', G' and B' image data output from the smoothing unit 102 are either stored in the image memory 101, or transmitted to a printer, a monitor or the like to be utilized for image formation.

In the foregoing description, the case of calculating exclusive OR's between R and G, and between G and B has been illustrated. If exclusive OR between B and R is also calculated, the number of smoothing steps can be increased, thereby improving the effect of smoothing processing. For example, when performing processing with 3×3 pixels, the value n in expression (1) is 27, and the number of smoothing steps is 28. Exclusive OR among R, G and B may also be calculated.

Although in the foregoing description, the case of using R, G and B image data as color image data has been illustrated, C, M and Y image data or the like may, of course, be used.

As described above, according to the first embodiment, by detecting correlation between color-component data and adding the obtained correlation to the parameter for smoothing processing, flat portions of an image are smoothed, thereby effectively removing noise, and sharpness can be maintained at edge portions of the image.

Second Embodiment

Figure 5:
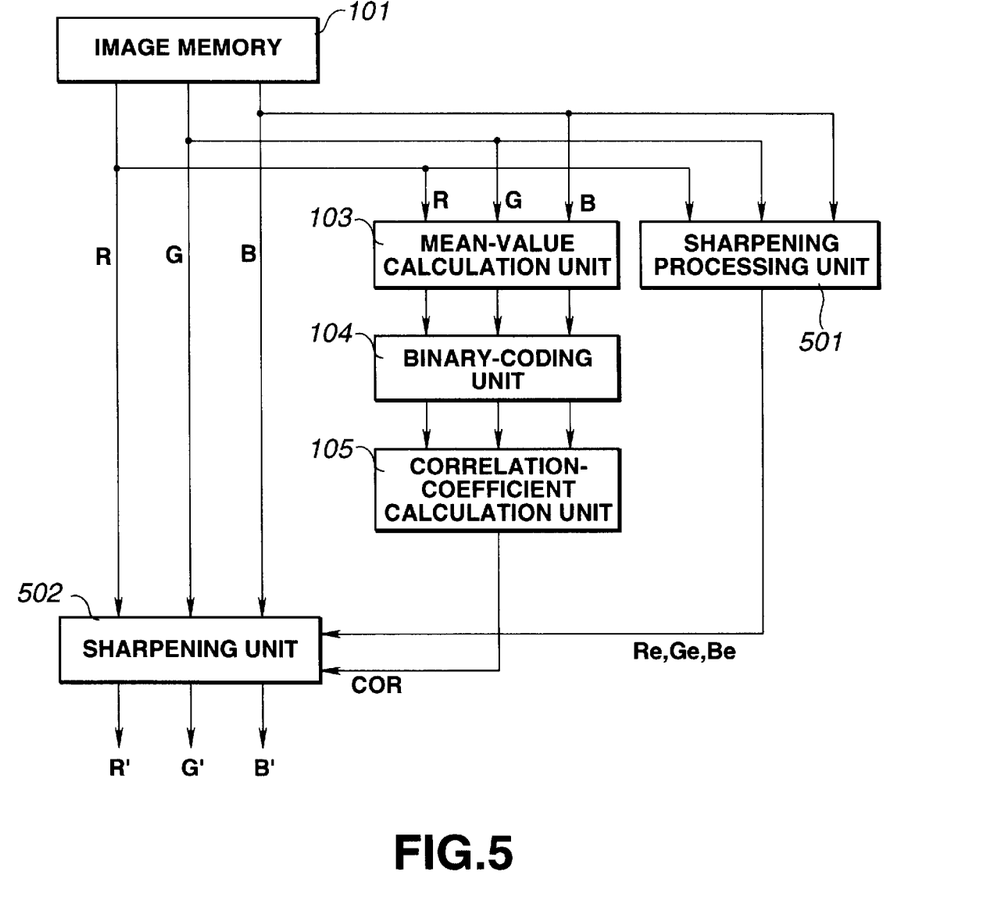
FIG. 5 is a block diagram illustrating the configuration of an image processing apparatus according to a second embodiment of the present invention.

FIG. 5 is a block diagram illustrating the configuration of an image processing apparatus according to a second embodiment of the present invention.

In FIG. 5, a sharpening processing unit 501 applies, for example, a Laplacian filter to each of the R, G and B color components, and outputs the results as sharpening signals Re, Ge and Be.

A sharpening unit 502 executes the following calculation for each pixel using the sharpening signals Re, Ge and Be of the original image:

$$X' = ((n-COR) \times X + COR \times Xe)/n \quad (2),$$

where X' is the pixel value after sharpening (R',G',B'), X is the pixel value before sharpening (R,G,B), Xe is the sharpening signal (Re,Ge,Be), and n equals 2×M×N.

In this case, a sharpening signal Xe is output at an edge portion where the COR has a maximum value, and original image data X is output without being modified at a flat portion where the COR has a minimum value.

Since other components are the same as those in FIG. 1, a further description thereof will be omitted.

By combining the above-described expressions (1) and (2), the following expression may also be used:

$$X' = ((n-COR) \times Xm + COR \times Xe)/n \quad (3).$$

As described above, according to the present invention, conversion of spatical-frequency characteristics, such as smoothing, edge emphasis or the like, can be excellently performed using correlation between color-component signals.

The present invention may be applied to a system comprising a plurality of apparatuses, such as a host computer, a printer and the like, or may be applied to an apparatus comprising a single unit, such as a copier or the like.

The present invention may, of course, be applied to a case in which the objects of the present invention are achieved by storing programs for executing the above-described procedures in a storage medium, such as a floppy disk or the like, and supplying a system or an apparatus with the programs from the storage medium.

Although in the foregoing embodiments, color image data is supplied from an image memory (frame memory), the above-described processing may be performed for color image data supplied from a color image reader, comprising a line sensor, in real time.

The correlation coefficient COR may be calculated from multivalue data, such as ternary data, quarternary data or the like, instead of binary data.

The individual components designated by blocks in the drawings are all well known in the image processing apparatus and method arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   detection means for detecting correlation between color-component signals of an input image signal; and
   smoothing means for performing smoothing processing on the image signal inversely proportional to the correlation detected by said detection means.

2. An image processing apparatus according to claim 1, wherein said detection means calculates the mean value of the values of pixels in a predetermined region in the vicinity of a target pixel for each color component, performs binary-coding processing of the values of the pixels in the predetermined region for each color component based on the calculated mean value for each color component, and calculates a correlation coefficient from characteristics between the obtained binary image data of respective color components.

3. An image processing apparatus according to claim 2, wherein the correlation coefficient is calculated from a result of calculation of exclusive OR of the binary image data for respective color components.

4. An image processing apparatus according to claim 3, wherein said smoothing means performs the smoothing processing by adding the value of the target pixel and the mean value using the correlation coefficient as a weight.

5. An image processing apparatus according to claim 2, wherein said smoothing means performs the smoothing processing by adding the value of the target pixel and the mean value using the correlation coefficient as a weight.

6. An image processing method comprising the steps of:
   detecting correlation between color-component signals of an input image signal; and
   performing smoothing processing on the image signal inversely proportional to the correlation detected in said detection step.

7. An image processing apparatus comprising:
   detection means for detecting correlation between color-component signals of an input image signal; and
   conversion means for converting spatial-frequency characteristics of the image signal in accordance with the detected correlation,
   wherein said conversion means performs sharpening processing when the detected correlation approaches a maximum value and performs smoothing processing when the detected correlation approaches a minimum value.

8. An image processing apparatus according to claim 7, wherein said detection means calculates the mean value of the values of pixels in a predetermined region in the vicinity of a target pixel for each color component, performs binary-coding processing of the values of the pixels in the predetermined region for each color component based on the calculated mean value for each color component, and calculates a correlation coefficient from characteristics between the obtained binary image data of respective color components.

9. An image processing apparatus according to claim 8, wherein the correlation coefficient is calculated from a result of calculation of exclusive OR of the binary image data for respective color components.

10. An image processing apparatus according to claim 8, wherein said conversion means performs the converting by adding the value of the target pixel and the mean value using the correlation coefficient as a weight.

11. An image processing method comprising the steps of:
    detecting correlation between color-component signals of an input image signal; and
    converting spatial-frequency characteristics of the image signal in accordance with the detected correlations
    wherein said converting step includes performing sharpening processing when the detected correlation approaches a maximum value and performing smoothing processing when the detected correlation approaches a minimum value.

12. An image processing apparatus comprising:
    detection means for detecting a correlation value between color-component signals of an input image signal; and
    smoothing means for performing stronger smoothing when the correlation value detected by said detection means is a low value.

13. An image processing apparatus according to claim 12, wherein said detection means calculates a mean value of pixel values in a predetermined region in a target pixel vicinity for each color component, performs binary-coding processing of the pixel values in the predetermined region for each color component based on the calculated mean value for each color component, and calculates a correlation coefficient from characteristics between an obtained binary image data of respective color components.

14. An image processing apparatus according to claim 13, wherein the correlation value is calculated from a result of an exclusive-OR calculation of the binary image data of respective color components.

15. An image processing apparatus according to claim 14, wherein said smoothing means performs the smoothing processing by adding a value of a target pixel and the mean value using the correlation coefficient a weight.

16. A method for an image processing apparatus, comprising the steps of:

detecting a correlation value between color-component signals of an image signal; and performing smoothing on the image signal, wherein stronger smoothing is performed when the correlation value is a low value.

17. An image processing apparatus comprising:

detection means for detecting correlation between color-component signals of an input image signal; and conversion means for converting spatial frequency characteristics of the image signal in accordance with the detected correlation, wherein said conversion means converts the spatial frequency characteristics by sharpening processing or smoothing processing in accordance with whether the detected correlation is high or low.

18. An image processing apparatus according to claim 17, wherein said detection means calculates a mean value of values of pixels in a predetermined region in a vicinity of a target pixel for each color component, performs binary-coding processing of the values of the pixels in the predetermined region for each color component based on the calculated mean value for each color component.

19. An image processing apparatus according to claim 18, wherein the correlation is calculated from a result of an exclusive-OR calculation of the binary image data for respective color components.

20. An image processing apparatus according to claim 18, wherein said conversion means performs the converting by adding the value of the target pixel and the means value using the correlation value as a weight.

21. A method for an image processing apparatus, comprising the steps of:

detecting correlation between color-component signals of an image signal; and converting spatial frequency characteristics of the image signal in accordance with the detected correlation, wherein the spatial frequency characteristics are converted in said converting step by sharpening processing or smoothing processing in accordance with whether the detected correlation is high or low.

22. An image processing apparatus comprising:

detection means for detecting correlation value between color-component signals of an input image signal; and smoothing means for controlling the strength of smoothing in accordance with correlation value detected by said detection means.

23. A method for an image processing apparatus, comprising the steps of;

detecting correlation value between color-component signals of an image signal; and controlling the strength of smoothing in accordance with correlation value detected by said detection means.

* * * * *

UNITED STATES PATENT AND TRADEMARK OFFICE
CERTIFICATE OF CORRECTION

PATENT NO.   : 5,956,432
DATED        : September 21, 1999
INVENTOR(S)  : KENICHI OHTA It is certified that error appears in the above-identified patent and that said Letters Patent is hereby corrected as shown below:

AT [57] ABSTRACT

Line 14, "example" should read --example,--.

COLUMN 2

Line 35, "FIG. 2A and 2B" should read --FIGS. 2A-1, 2A-2 and 2B--.

COLUMN 3

Line 6, "means" should read --mean--.

COLUMN 4

Line 8, "means" should read --mean--.

COLUMN 5

Line 22, "quarternary" should read --quaternary--.

COLUMN 6

Line 40, "correlations" should read --correlation,--.

COLUMN 7

Line 2, "coefficient" should read --coefficient as--.

UNITED STATES PATENT AND TRADEMARK OFFICE
CERTIFICATE OF CORRECTION

PATENT NO.    : 5,956,432

DATED         : September 21, 1999

INVENTOR(S)   : KENICHI OHTA

It is certified that error appears in the above-identified patent and that said Letters Patent is hereby corrected as shown below:

COLUMN 8

Line 3, "means" should read --mean--.

Signed and Sealed this

Eighth Day of August, 2000

Attest:

Q. TODD DICKINSON

*Attesting Officer*    *Director of Patents and Trademarks*